Jan. 21, 1969  J. W. TURNER, JR  3,422,506
CONVERTIBLE ELEVATOR
Filed Dec. 26, 1967  Sheet 1 of 3

JOHN W. TURNER, JR.
INVENTOR.

BY C. G. Stallings

ATTORNEY

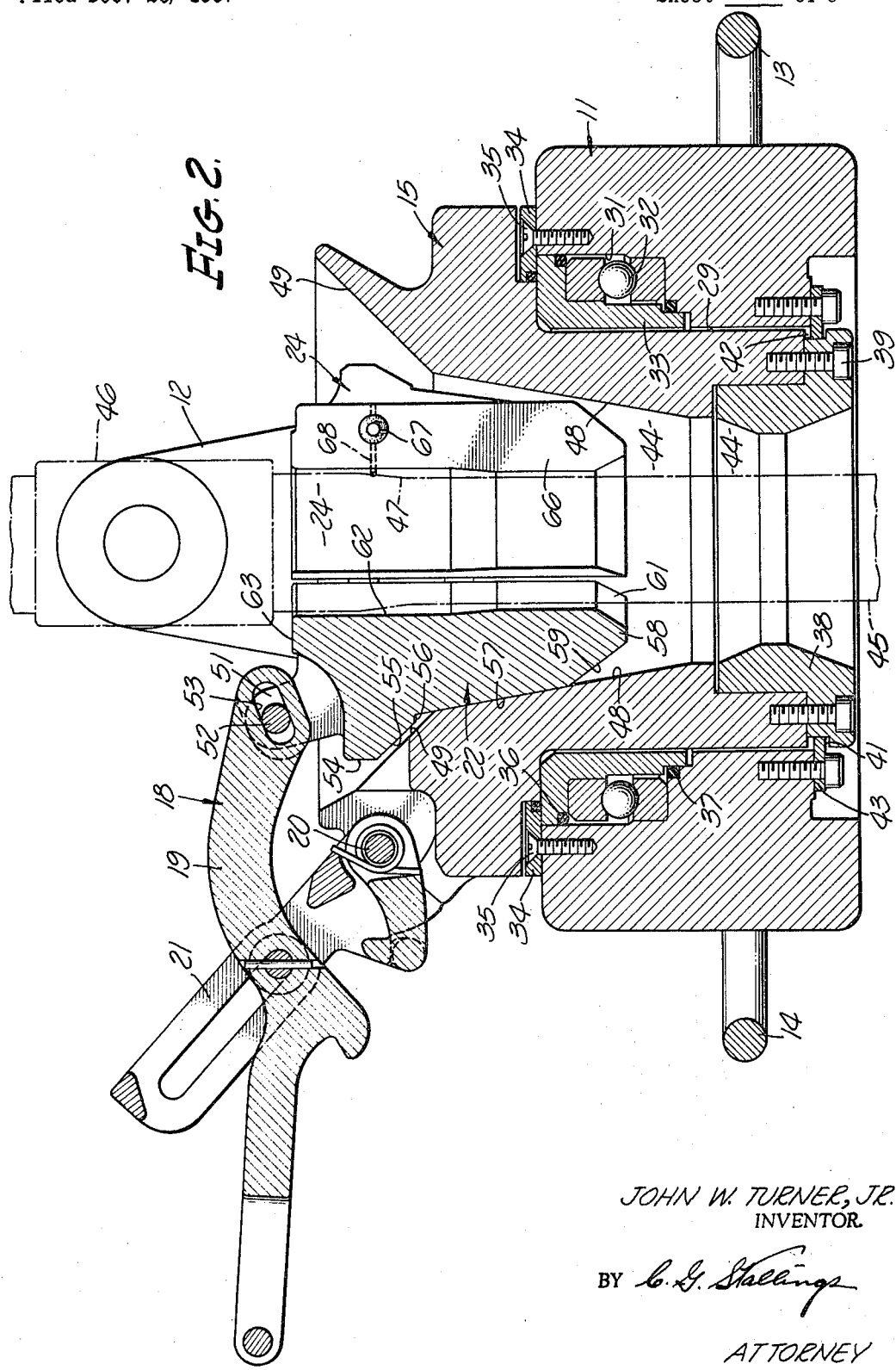

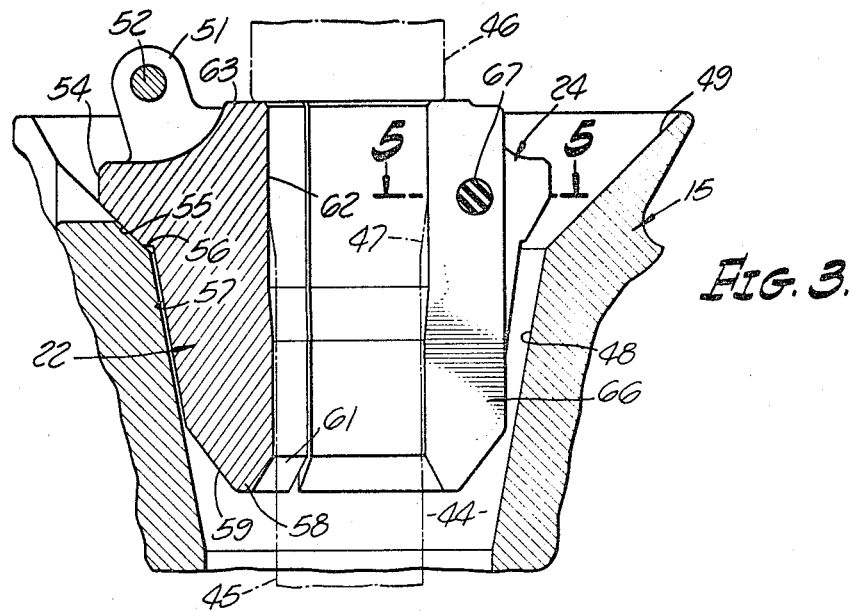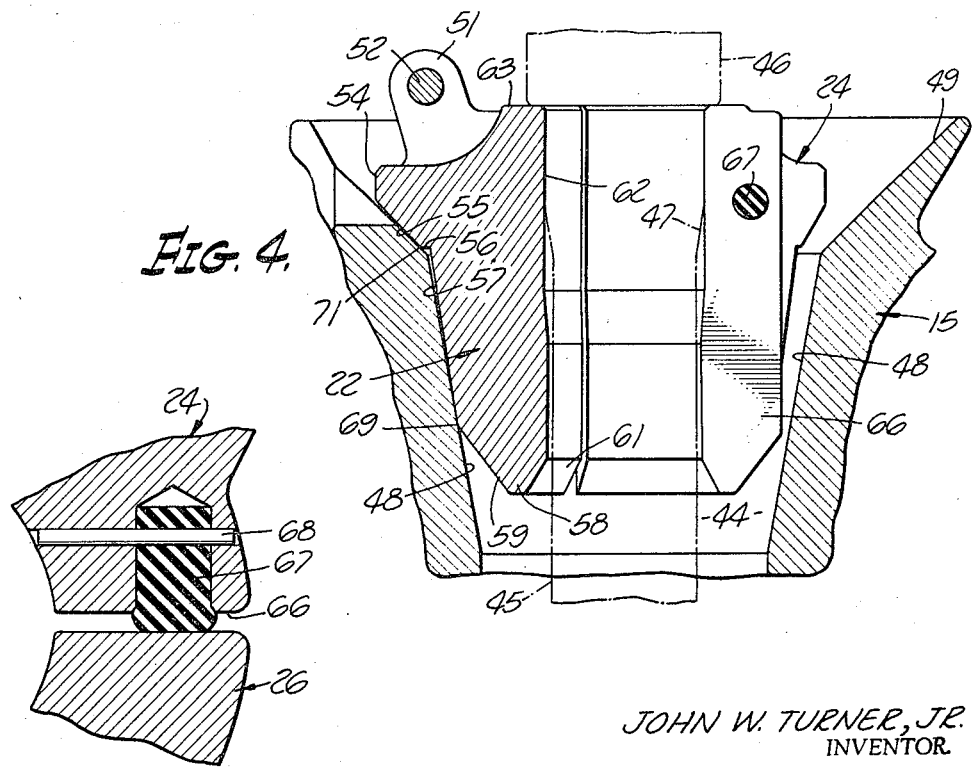

United States Patent Office 3,422,506
Patented Jan. 21, 1969

3,422,506
CONVERTIBLE ELEVATOR
John W. Turner, Jr., Houston, Tex., assignor to Byron Jackson, Inc., Long Beach, Calif., a corporation of Delaware
Filed Dec. 26, 1967, Ser. No. 693,350
U.S. Cl. 24—263     9 Claims
Int. Cl. A44b 21/00; B66c 1/22

ABSTRACT OF THE DISCLOSURE

An elevator slip assembly wherein the slips have smooth pipe engaging surfaces, with pipe collar supporting top lands, each slip having a tapered back surface adapted to mate with a correspondingly tapered bowl inner wall while the slips are being seated in pipe supporting position in the slip bowl, and each slip having a radially outwardly extending flange adapted to engage a tapered ramp on the slip bowl, whereby the flanges of the slips will assume and support the entire pipe load, will move the slips radially inward to substantially disengage the back of each slip from the slip bowl and tilt the slips to grip the pipe adjacent its collar.

BACKGROUND OF THE INVENTION

This invention has to do with a slip arrangement intended primarily for use in a convertible elevator or in a spider wherein the body of the elevator is either provided with a bore having a frusto-conical wall tapering downwardly and radially inwardly, and a second frusto-conical portion above the first-mentioned wall, forming a tapered ramp portion of greater angularity with respect to the vertical than the taper of said wall, or is provided with a slip bowl having such frusto-conical surfaces. For the purposes of the description herein, the disclosure is generally to an elevator body structure having a rotatable slip bowl with a frusto-conical inner wall and a frusto-conical ramp intersecting said wall near the top thereof.

Field of the invention

The invention is generally in the field of elevator devices for working, that is, supporting, raising, lowering or otherwise positioning pipe, casing or other elongated objects in an earth bore, such as an oil well, intended for use primarily with casing or pipe in which the sections are joined together by a collar.

Description of the prior art

Heretofore, devices have been provided in which the pipe collar was used as a support, such as the so-called "flapper" type of arrangement wherein two hinged pipe supporting flappers were adapted to fit over the bore and around the pipe to be supported and on which the collar of the pipe rested and the pipe was supported solely thereby and performed little or no gripping action against pipe rotation. Further, in case of a loose or defective collar, there was danger of dropping the pipe string with consequent serious loss and expense. Other prior art structures provided for slips having toothed dies to engage the pipe, the teeth of which dies bit into and supported the pipe. The latter are primarily intended for the support of smooth (collarless) pipe and have a tendency to damage the pipe wherever it is engaged by the dies. Such dies are expensive, are easily damaged, and can be displaced inadvertently and accidentally dropped into the well bore with severe consequences.

The present invention is adapted for use in an elevator-bowl arrangement, such, for example, as that shown in applicant's pending application, Ser. No. 586,218, filed Oct. 12, 1966, for Convertible Elevator. It is also suitable for use in a spider structure not having a rotatable bowl such as that disclosed in applicant's Patent No. 3,268,969 dated Aug. 30, 1966, entitled, Spider for Well Pipe.

SUMMARY

It is one of the objects of the present invention to provide an arrangement in which a plurality of slips, each having a smooth inner or pipe-engaging face surface, are adapted to support a pipe by both resting the pipe collar on the slips and by the slips gripping the pipe beneath and adjacent to the collar. With this arrangement it is a feature that the pipe is securely centered and held by the slips in conjunction with the support of the collar by the slips; and much, if not all, of the tendency to strip the collar from a long string of heavy pipe by stripping the threads thereof, is avoided. The grip of the slips also holds the pipe from rotation with respect to the slips when making-up or breaking out the joints.

It is another object of the present invention to provide an arrangement eliminating the need for dies which are easily damaged, expensive, and have a tendency to damage the pipe.

It is a further object of the present invention to provide an arrangement in which the slips do not grip the pipe firmly until the full, or a substantial part of, the load of the pipe on the slips is obtained.

It is a primary object of the present invention to provide an arrangement in which the slips seat against the collar when the pipe has moved through the elevator or, if such is the case, the elevator has moved up on the pipe, and the weight of the pipe causes the slips to move downwardly in the slip bowl prior to the full load resting thereon, and the slips then operate to shift their support under the full load of the pipe from the back of the slips to a flange engaging the ramp portion of the slip bowl whereby the slips will tilt or cant slightly and thereby grip the pipe in the upper portion of the slips near the pipe collar.

It is also an object to disclose an arrangement whereby the slips are in position to receive the weight of the pipe collar and encircling the pipe being worked, but are held by resilient means against gripping the pipe in its movement through the elevator until the collar of the pipe has seated on the top of the slips and substantial weight of the pipe has been transferred to the slips through their engagement with the collar. This prevents the slips from improper engagement by snagging an irregularity on the pipe, such as an upset portion of the pipe, prior to the weight of the pipe being placed on the slips by the collar resting on the top of the latter.

It is an object to provide a novel resilient means and arrangement urging the slips apart from the pipe until proper time for engagement of the slips with the pipe. Such resilient means also helps prevent the slips from prematurely seating in the slip bowl in a pipe gripping position, and helps release the slips when it is desired to disengage them.

It is a further feature to provide an arrangement which can be quickly substituted in the field for other types of slips or retaining means, such as the toothed die type or the flapper type, thus making the slips suitable for use in convertible elevators.

It is a further object and purpose to provide a simple arrangement, less expensive than those presently on the market or known to others, and which may be readily manufactured and used without difficulty by those experienced in the trade.

Other objects will become evident as the invention is described in the following detailed description, along with the accompanying drawings.

BRIEF DESCRIPTION OF THE DRAWINGS

In the drawings:

FIG. 2 is a side elevational view, partly in cross-section, taken on the line 2—2 of FIG. 1 looking in the direction of the arrows, and showing a slip assembly illustrative of the present invention in position relative to the slip bowl and encircling a pipe, but not engaging the pipe or the collar thereof;

FIG. 3 is a fragmentary elevational view, partly in cross-section, illustrating the slip assembly of FIG. 2, the slips being in contact with the collar of a length of pipe being worked, the slips shown as having moved part way down into the slip bowl, but prior to the supporting by the slips of the full weight of the pipe;

FIG. 4 is a view similar to that of FIG. 3, but illustrating the relative position of the slip assembly, the slip bowl, and the pipe being worked, when the full weight of the pipe is on the slip assembly and the latter is in the full down position fully supporting and gripping the pipe; and FIG. 5 is a fragmentary cross-sectional view, taken on the line 5—5 of FIG. 3, looking in the direction of the arrows.

DESCRIPTION OF THE PREFERRED EMBODIMENT

Figure 1:
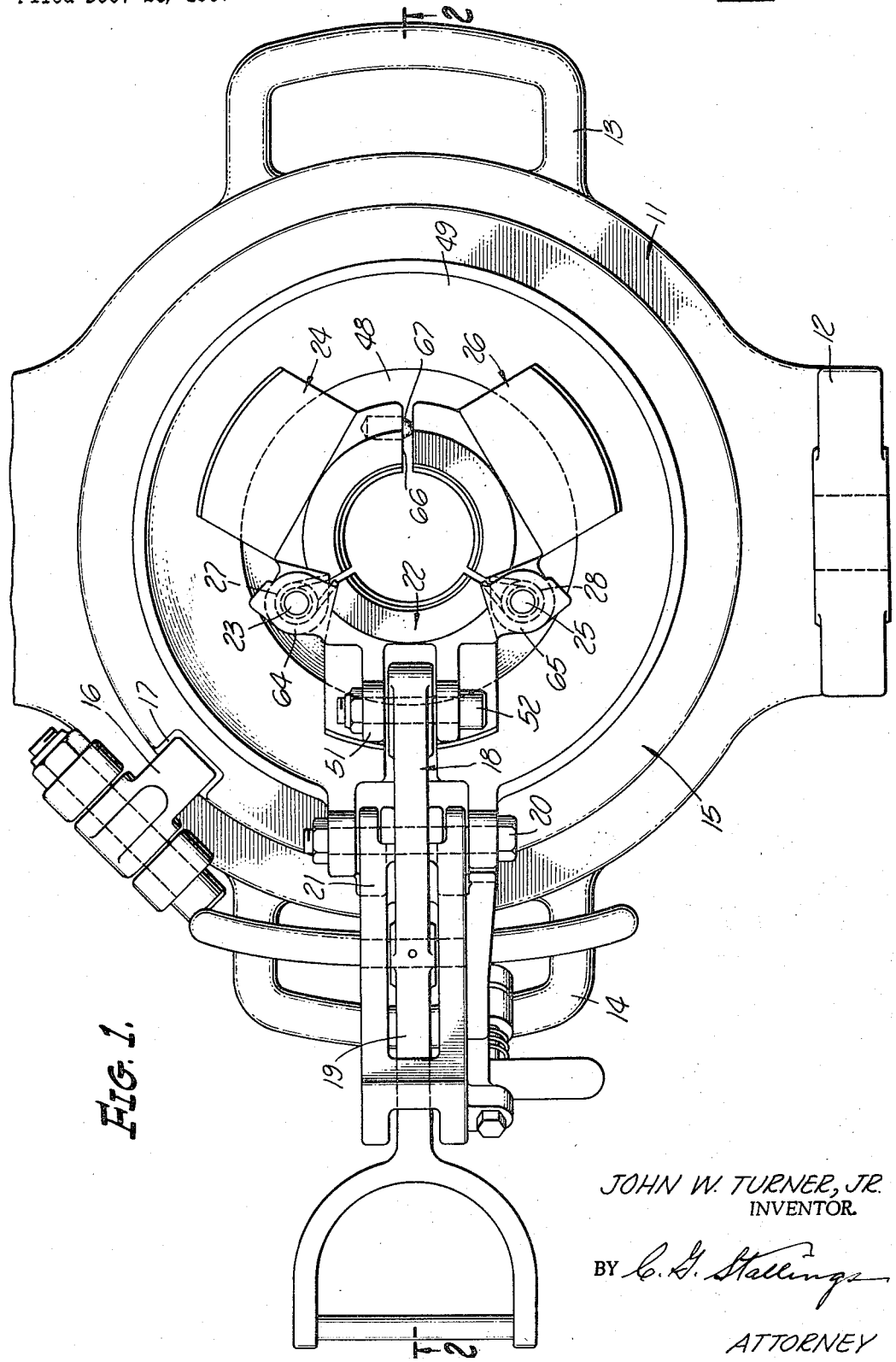
FIG. 1 is a fragmentary plan view showing the device of the present invention in an elevator body having a rotatable slip bowl.

Referring more in detail to the disclosure of the various drawings, and referring first primarily to FIG. 1, there is shown an elevator body 11 having a support arm 12 and a pair of handles 13 and 14. The support arm 12, of course, is one of a pair (the second one not being shown) by means of which the elevator is attached to a traveling block (not shown) by elevator links or the like; and the handles 13 and 14 are used by the operator for manipulating and positioning the elevator.

The elevator body 11 has a central vertical bore therethrough which (as will be clear from the other figures hereinafter described) receives a slip bowl 15 adapted to be rotated in the elevator body. Mounted on the elevator body are means comprising a releasable latch 16 adapted to engage a slot 17 of the bowl to hold it against rotation when the latch is engaged.

Mounted on the slip bowl 15 is what may be broadly termed a slip positioning means 18, which includes a lever 19 mounted to pivot on an arm 21 which is in turn pivoted about a pivot bolt 20 carried by the slip bowl 15, and which lever 19 has, releasably attached to the inner end thereof, a center slip 22. Other features of the slip positioning means are disclosed in applicant's prior copending application mentioned above.

The center slip 22 has hinged thereto, by hinge pin 23, a side slip 24, herein sometimes referred to as the left-hand side slip, and on its other side the center slip 22 has hinged thereto by means of the hinge pin 25 another side slip 26, herein sometimes referred to as the right-hand side slip. It will thus be seen that operation of the slip positioning means 18 will operate to raise, lower, hold, or otherwise position, the center slip 22 and its attached side slips 24 and 26 as a unitary slip assembly. As shown in dotted lines in FIG. 1, spring means comprising a coiled spring 27, coiled around the hinge pin 23 with its free ends bearing against the center slip 22 and the left-hand side slip 24, operates to urge the slip 24 to swing or pivot outwardly about the pin 23. Similarly, spring means comprising the coiled spring 28 on the hinge pin 25 urges the right-hand side slip 26 to pivot outwardly about the pin 25, the coil springs 27 and 28 thus urging the slips 24 and 26 apart.

Referring next to the other figures, and referring first to FIG. 2, the elevator body 11, as noted above, has a vertical bore 29. A downwardly extending counterbore or recess 31 is provided in the upper radially inner surface of the elevator body 11, in which is mounted bearing means 32 and bearing ring or retainer 33, which bearing ring is annular in shape and has a top flange portion extending radially outwardly across the top of the bearing 32. This bearing ring 33 is rotatable on said bearing 32, and is held in place by retainer ring 34 which is attached to the elevator body 11 by means of machine screws 35, the retainer ring extending partially over the bearing ring in a radially inward direction. O-ring seals 36 and 37 serve to protect the bearing against contamination by dirt or the like and also to retain therein the lubricant usually present.

Located in the bore 29 is the slip bowl 15 which has a radially outwardly extending upper annular flange portion that rests on and is supported by the bearing ring 33. Thus the slip bowl 15 is free to rotate with the bearing ring 33 on the bearing 32 with respect to the elevator body 11.

A wear ring 38 is attached to the bottom of the slip bowl 15 by any convenient means, such as machine bolts 39; and the wear ring is recessed as shown at 41 whereby when the wear ring is attached to the bowl 15, an annular groove 42 is formed at the juncture. A snap ring 43, or ring segments or other suitable means if desired, holds the bowl and its attached wear ring against upward displacement from the elevator body 11 while, at the same time, the arrangement allows the bowl structure to be readily removed by removing the snap ring 43 or the wear ring 38. This will enable the operator to substitute in the elevator body 11, slip bowl assemblies or wear rings, as may be desired.

As will be evident from the drawings, the slip bowl 15 and the wear ring 38 have a vertical opening 44 extending therethrough, through which pipe, herein indicated schematically in broken lines as pipe 45, extends when the elevator assembly is in use for positioning or holding such pipe; that is, for working the pipe by raising it, lowering it or otherwise positioning it in the well bore. The pipe 45 is provided with a collar 46. In the arrangement shown, the pipe has what may be termed an external upset portion 47 which is a radial enlargement of the pipe at the joint and as as shown below the collar, which is common to pipe frequently used in oilfield operations.

The slip bowl 15, in its bore portion 44, is formed in a frusto-conical or tapered shape which forms the interior sidewall of the inner circumference of the bore, and which is herein referred to as the frusto-conical or tapered wall 48. This frusto-conical sidewall on the interior of the slip bowl 15 is tapered or slanted on an acute angle with respect to the vertical; for example, on about a 10° angle.

The upper portion of the slip bowl 15 is provided with a circumferential ramp 49 which slants or tapers radially inward from top to bottom on a much larger angle than the tapered wall 48 with respect to the vertical; for example, a 45° angle or slant, and the ramp intersects the frusto-conical wall 48 at the top of the latter. The purposes of this ramp will be described more in detail herein.

Referring to the slips themselves, and referring first to center slip 22 as shown particularly in FIG. 2, this center slip is provided with an upstanding bifurcated ear 51 which has a hole therethrough to receive the slip bolt 52, by means of which bolt 52 the slip is mounted in the slot 53 on the end of the lever 19. By this arrangement, raising and lowering of the lever 19 will raise and lower the slip 22, and the slot 53 allows the bolt 52 to move laterally so that slip 22 may adjust to its desired position with respect to the slip bowl 15.

The slip 22, as will be apparent from the cross-sectional view thereof in various of the figures, has a radially outwardly extending flange portion 54, the underside back surface 55 of which is shaped like a segment of a cone, being complementary, when the slip is seated in the bowl 15, to the adjacent surface portion of the ramp 49 and tapered approximately the same amount—in the example shown here about 45° from the vertical. This tapered slip back 55, at its lower edge, terminates in a slight undercut or radial land or groove 56, for example, about one-eighth to one-fourth of an inch of radial depth at its top edge for reasons that will be apparent hereafter.

Below the flange 54 and undercut 56, and intersecting the latter, the radial outer surface or back of the slip 22 has another conical surface, herein termed back 57, which extends downwardly to just above the bottom end or nose of the slip and which is tapered so that when the slip is resting against the sidewall 48 of the slip bowl, the back 57 of the slip is complementary to the conical shape and taper of the slip bowl sidewall 48. Thus, in the example shown, the taper of the back of the slip 22 extends downwardly and radially inwardly and is approximately 10° in taper from the vertical.

The slip is provided with the nose 58, which nose has a conical back 59 tapered to a greater degree from the vertical than the back 57 of the slip. On its radially inward surface, the nose of the slip is also given a conically-shaped slant or taper 61, the surface 61 being primarily for the purpose of preventing an irregularity on a pipe being worked from snagging the slip.

It is noted that the radially inward or front surface 62 of the slip is relatively smooth. In this connection, in the drawing indicated here, the surface of the slip is shaped generally to the configuration of the pipe area it is intended to grip, but since the gripping action is primarily or entirely in the upper part of the face of the slip, that portion only intended to grip the pipe is of primary importance with respect to its smoothness. The slip herein described is intended to operate without dies so that there is intended to be no irregularities which would upset the metal and damage the pipe. Thus, the slip may be described as having a smooth face.

The upper end of the slip is provided on its top portion with a land 63 on which will rest the bottom of the collar 46 when the slip contacts the collar in the pipe supporting position shown in FIGS. 3 and 4.

Referring again to FIG. 1, it is noted that the slip 22 is provided with laterally extending lugs 64 and 65 through which the hinged pins 23 and 25 extend. Corresponding lugs on the slips 24 and 26 are aligned with lugs 64 and 65 and the pins 23 and 25 thus form hinges by means of which the slips 24 and 26 are mounted on the center slip 22, the mounting, as above pointed out, allowing the slips 24 and 26 to swing laterally about the hinged pins 23 and 25 respectively. The pins 23 and 25 are preferably loosely mounted in the lugs 64 and 65, and/or the corresponding side slip lugs, to permit the slips to adjust for different positions with respect to the center slip 22.

With the exception of the ear 51, the above description applies equally to the slips 24 and 26. Raising, lowering, or otherwise positioning the slip 22, will operate at the same time to raise, lower, or otherwise position the slips 24 and 26, such arrangement therefore causing the slips to operate as a unitary assembly and enabling the operator to manipulate the slip assembly by slip positioning means 18.

Referring to FIGS. 1 and 5 in particular, and to the other figures for clarity, the side slips have supplemental means which urge their free sides apart. In the illustration shown, the side 66 on the left-hand slip 24 is provided with a resilient plug 67, which is illustrated in FIG. 5 as being a rubber plug inserted in the side face 66 of the slip 24 and held therein by a pin 68. In actual practice a spring pressed plunger or a leaf spring arrangement would be equally feasible, or perhaps even preferable, to a rubber plug; but the rubber plug is illustrative of a resilient means which could be used and is thus shown for illustrative purposes. It is noted that the resilient means extends outwardly from the face 66 of the left-hand slip 24 to a position to be contacted by the side face of the slip 26, whereby the faces of the two side slips are maintained spaced a predetermined distance by resilient means which will allow them to move nearer each other under radial forces exerted as the slips move into the slip bowl to a gripping position on the pipe. By this arrangement, the slips are maintained "open" or apart, preventing them from gripping the pipe being worked until the weight of the pipe collar resting on the top of the slips causes them to move down in the bowl and thus forces the free sides of the slips closer together toward a gripping engagement. Thus, pipe moving through the slip assembly is not engaged by the slips prematurely.

OPERATIONAL DETAILS

In operation, ordinarily the slip bowl 15 with its slip positioning means 18, will be located in the elevator body 11. When the operator desires to work collared pipe, he will remove any previous slips by removal of the slip bolt 52 (that is, the corresponding bolt in the previous slips) and will set the slip assembly, comprising the center slip 22 and the attached side slips 24 and 26, in position in the slip bowl for the ear 51 of the center slip to be aligned with the end of the lever 19. The slip bolt 52 is inserted through the slot 53 of the lever 19 and through the ear 51 of the center slip 22, and the nut and other holding means threaded in place on the bolt 52.

Depression of the outwardly extending handle of the lever 19 serves to raise the slip assembly to a position where the tapered nose back 59 of the slips rests on the ramp 49 of the slip bowl 15. Ordinarily, in this position, the lever will be latched to retain the slotted end of the lever 19 in its raised position. The slips 24 and 26, under the influence of the springs 27 and 28, will spread the free sides of the slips 24 and 26 apart so that the slip assembly is out of the vertical opening 44, at least to an extent that will not interfere with passing the elevator over the free end of the pipe 45.

After the elevator has been passed over the end of the pipe 45 and moved to a position below the collar 46, the latch means for the lever 19 will be released and the slips 22, 24 and 26, under the influence of gravity, will move downward off of the ramp 49 and on to the sidewall 48 of the bowl 15. As this occurs, the slips 24 and 26 encircle or surround the pipe 45 but do not contact the pipe 45 by reason of the spacing of the free sides of the slips 24 and 26 due to the action of the resilient plug 67. The slips 24 and 26, however, will approach each other to where the slip 26 is resting against the resilient plug 67, in which position (indicated in FIGS. 1 and 2) the back 57 of each of the slips will be complementary to the sidewall 48, and the slips will have closed sufficiently around the pipe so that the lands 63 on the tops thereof will extend radially inwardly to a position below the bottom of the collar 46 and in position to support the collar upon further relative movement of the elevator with respect to the pipe 45. It is noted, however, that in the positions of FIGS. 1 and 2 there is no danger of the slips snagging on the pipe and prematurely setting the assembly with a gripping action.

As the elevator moves up on the pipe (or the pipe moves down in the elevator, as the case may be), the lands 63 will encounter the bottom of the pipe collar and the slips will move further into the bowl 15, as shown in FIG. 3, to a position where the back 55 of the slip flange 54 will engage the ramp 49, moving the slips inward and the tapered back 57 of the slips slightly away from the sidewall 48 of the bowl.

Further downward movement under pressure of the weight through the slip collar on the top lands 63 will cause the slips to move all of the way inward to a gripping position, the movement being the downward slippage of the slip flange on the ramp 49. When this occurs, the slips will pivot on the top of the undercut 56 to where substantially the entire weight of the pipe will be supported by the pivot point or line 71, through the slip flange 54. This support or pivot point 71 occurs just short of the bottom end of the ramp 49. It is noted that the bottom of each of the slips then moves slightly radially outward and forms a point or line contact 69 stabilizing the slip. The upper inner surface of the slips, under influence of the pivoting action, will move slightly toward the pipe, firmly gripping the pipe and assisting the collar in supporting the weight of the pipe. It is noted that the above description is equally applicable to all three slips working as a unit. The tipping of the slips relative to the lever 19 is permitted by movement of the bolt 52 in the slot 53, and by the slight clearance or looseness afforded by the pins 23 and 25 in the lugs 64 and 65. The resilient plug 67 still prevents the slips from totally coming together at their free ends and crushing the pipe.

Downward movement of the elevator with respect to the pipe collar will tend to raise the slips slightly and, under influence of the resilient means 67 and the springs 27 and 28, the slips will swing outward releasing the pipe and enabling the operator to raise the slips from the bowl by manipulating the slip positioning means 18, that is, by raising the slotted end of the lever 19, to remove the slips from the vertical opening 44.

It is noted that the pivot point 71 on the flange 54, that is, the top of the undercut 56, at its furthest downward movement is still above the intersection of the ramp 49 and the sidewall 48. This prevents the metal on the corner caused by the intersection from being upset and bulged radially inward to where it would interfere with the proper action of the slips. In ordinary practice, this pivot point would be from one-eighth to one-fourth of an inch above the intersecting lines of the two bowl surfaces, namely, the ramp and the sidewall.

I claim:
1. An elevator slip assembly and slip bowl assembly for working collared pipe and the like, comprising in combination:
   (a) a slip bowl having a conical wall surface and a conical ramp above said wall surface;
   (b) a slip assembly having a center slip and plurality of side slips each hingedly connected at one side to said center slip, said side slips being free to move apart at their unhinged sides;
   (c) said slips having smooth pipe-engaging face surfaces and pipe collar supporting means on their upper surfaces, and being adapted to encircle a pipe located in said slip bowl;
   (d) said slips having flange means adapted to rest on said slip bowl ramp; and
   (e) resilient means carried by at least one of said side slips spacing the free sides of said side slips apart when said slips are in said slip bowl and prior to engagement of said slip faces with said pipe.

2. A slip assembly and slip bowl assembly as claimed in claim 1 wherein the pipe collar supporting means of said slips are lands on the top of said slips positioned to engage a pipe collar and wherein the slips are spaced from engagement of the pipe by the slip faces when the slips are in the slip bowl prior to the slips being forced fully down in the slip bowl, said resilient means retaining the slips from prematurely gripping the pipe.

3. A slip assembly and slip bowl assembly as claimed in claim 2 wherein the weight of the pipe resting on the slip collar supporting means causes the slip flange means to assume the load of the pipe and forces the slip faces into gripping engagement with the pipe by overcoming resistance of the resilient means, the arrangement being such that the slips tilt inward at the top for gripping of the pipe beneath the pipe collar and the slips rest against the wall of the slip bowl to thereby stabilize the slips.

4. A slip assembly and slip bowl assembly as claimed in claim 3 wherein the slip bowl is provided with means for positioning said slips, and one of the slips is provided with means operatively connecting the slip assembly to said positioning means.

5. A slip assembly and slip bowl assembly as claimed in claim 4 wherein the hinged means connecting said slips together are loosely mounted to permit the slips to adjust relative to each other and wherein the means attaching said slip to said slip positioning means allows the slips to adjust relative to said slip positioning means for seating of said slips in said slip bowl.

6. In a slip assembly for a convertible elevator and the like for holding, raising and lowering collared pipe, said elevator being provided with slip receiving means, such as a slip bowl (15) having a passage therethrough (44) with a downwardly and inwardly slanting ramp portion (49) of generally truncated conical shape, and a downwardly and inwardly slanting sidewall (48) also of generally truncated conical shape below said ramp portion (49), said ramp portion (49) having a greater degree of slant from the vertical than said sidewall (48), and said elevator being provided with slip positioning means (18), those improvements comprising:
   (a) a center slip (22) having means (51, 52) attaching it to said slip positioning means (18), and side slips (24, 26) hingedly attached to said center slip (22) whereby positioning said center slip serves to position said side slips as a unit therewith;
   (b) means comprising lands (63) on the upper part of each of said slips (22, 24, 26) adapted to receive and support a pipe collar;
   (c) said slips each having a radially outwardly extending slip flange (54) with an underside back surface (55) having a taper with an angularity generally complementary to the taper of said ramp (49), and each of said slips having a back portion (57) with a taper having an angularity generally complementary to the angularity of the taper of said sidewall (48), and each of said slips (22, 24, 26) having smooth face portions (62) adapted to grip pipe being worked by said elevator; and
   (d) the arrangement being such that the weight of the pipe on the pipe collar and lands (63) on the upper part of each of said slips causes the slips to move downward in the slip bowl (15) with the back portions (57) of said slips engaging the sidewall (48) of said slip bowl to a position where the underside back surfaces of said flange (54) engage said ramp (49) and move the slips inwardly and downwardly, tilting the slips inwardly at their upper portions into pipe-engaging and gripping position, the weight of said slips and said pipe being carried by said slip flange portions (54) when the full weight of said pipe is resting on said slips and said slips are in their innermost and furthest down position.

7. A slip assembly as claimed in claim 6 wherein said slips (22, 24, 26) are provided with a radial undercut (56) between said flanges and said slip back portions (57), whereby a pivot (71) forms the support for said slips on said ramp (49), and whereby said support pivot is radially outward from the intersection of said ramp (49) and said sidewall (48), thereby protecting said intersecting surfaces against deformity under load.

8. A slip assembly as claimed in claim 7 wherein:
   (a) said side slips (24, 26) have free sides (66) away from said hinge means (23, 25) free to swing apart;
   (b) springs (27, 28) urging said side slips apart; and
   (c) resilient means (67) carried by one free side (66) of said side slip and engaged by the adjacent free side of the other side slip when said slips are positioned in said slip bowl (15) to maintain the free ends of said slips spaced apart for movement of pipe therethrough until the weight of the pipe on the slip lands (63) moves the slips (22, 24, 26) downward into the slip bowl (15) and causes the slips to move radially inward into pipe-engaging and gripping position, said resilient means being adapted to yield sufficiently under load to allow said gripping effect.

9. In a slip assembly for a convertible elevator and the like, said elevator being provided with slip receiving means, such as a slip bowl (15) having a passage (44) therethrough with a downwardly and inwardly tapering ramp portion (49) of generally truncated conical shape, and downwardly and inwardly tapering sidewalls (48) also of generally truncated conical shape below said ramp portion (49), said ramp portion (49) having a greater degree of taper from the vertical than said sidewall (48), and said elevator being provided with slip positioning means (18), those improvements comprising:

(a) a center slip (22) having means (51, 52) attaching it to said slip positioning means (18), and side slips (24, 26) hingedly attached to said center slip (22) whereby positioning said center slip (22) serves to correspondingly position said side slips as a unit therewith, (b) said slips each having a radially outwardly extending slip flange (54) with underside back surfaces (55) having a taper with an angularity generally complementary to the taper of said ramp (49), and each of said slips having a back portion (57) with a taper having an angularity generally complementary to the angularity of the taper of said sidewall (48);

(c) means comprising lands (63) on the upper part of each of said slips (22, 24, 26) adapted to fit beneath and receive and support a pipe collar when said slips encircle collared pipe in said slip bowl (15);

(d) each of said slips (22, 24, 26) having a smooth face portion (62) adapted to cooperate with the smooth face portion of each other slip to grip pipe when said slips are in a substantially full down and inward position encircling a pipe in said slip bowl (15);

(e) said slips (22, 24, 26) having free sides (66) on the sides away from said hinge means (23, 25) free to swing apart, whereby said slips do not interfere with the passage of pipe through said slip bowl when the slip assembly is raised to its upper position with respect to said bowl;

(f) means comprising springs (27, 28) urging said side slips apart;

(g) resilient means (67) carried by the free side (66) of one of said side slips and engaged by the complementary free side of the other side slip when said slips are positioned in said slip bowl, whereby to maintain the slips spaced apart for the movement of pipe therethrough until the collar of the pipe engages the lands (63) on the upper part of said slips and moves the slips (22, 24, 26) downward into the slip bowl (15), said movement downward urging the slips inwardly into pipe-gripping position, said resilient means being adapted to yield to allow said gripping effect;

(h) means comprising a radial undercut (56) between said flange (54) back surfaces (55) and said slip backs (57) to form a pivot point or line (71) for the flange radially outward of the sidewall (48) upon tilt of said slips into pipe-gripping engagement in their full inward and downward position; and (i) the arrangement being such that the slips may be lifted clear of the slip bowl passage (44) and rested on said ramp (49) while collared pipe is moved into position in said passage (44), and the slip positioning means (18) may be actuated to move the slips into pipe encircling position in said slip bowl with said lands underneath the collar of said pipe in position to be engaged thereby, the slips being adapted to ride down the sidewall (48) of said slip bowl to engagement of the flange back portion (55) with the ramp (49), whereupon the slips move down the ramp under weight of the pipe collar on the lands (63), moving the slips inwardly and downwardly and disengaging the slip back portions (57) from the sidewall (48), tilting the slips inwardly at the top and causing the smooth face surfaces (62) to engage the pipe, the slips maintaining contact (69) near the slip bottoms with the sidewall (48) for stabilizing the slips, said slips being maintained spaced from the pipe by resilient means until the slip flange surfaces (55) engage the ramp (49), whereby the pipe may be moved prior to final seating of the slips relative to said slip bowl (15).

References Cited

UNITED STATES PATENTS

| | | | |
|---|---|---|---|
| 1,111,535 | 9/1914 | Greve | 24—263.5 |
| 1,923,283 | 8/1933 | Stokes | 24—263.5 |
| 2,151,208 | 3/1939 | Hiniker | 24—263.5 |
| 2,183,526 | 12/1939 | Abegg | 24—249 XR |
| 2,607,098 | 8/1952 | Wilson | 24—249 XR |
| 2,890,513 | 6/1959 | Lane | 24—263.5 |

DONALD A. GRIFFIN, *Primary Examiner.*

U.S. Cl. X.R.

294—102